May 24, 1960     O. MAISCH     2,937,666
INTERNAL TUBE SEAL
Filed May 31, 1957
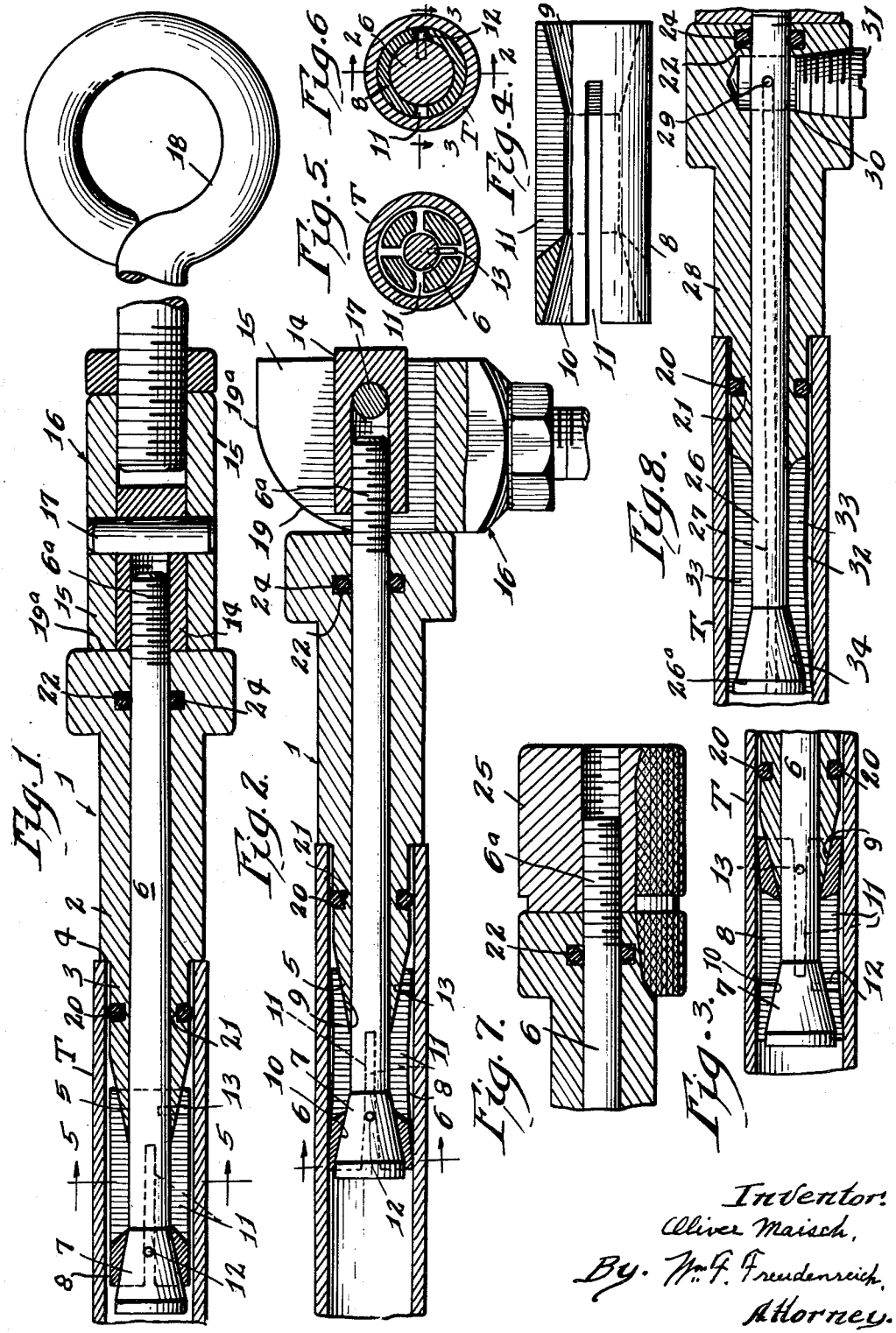

United States Patent Office 2,937,666
Patented May 24, 1960

2,937,666
INTERNAL TUBE SEAL
Oliver Maisch, 168 N. Ogden Ave., Chicago, Ill.
Filed May 31, 1957, Ser. No. 662,702
2 Claims. (Cl. 138—89)

There are many situations in which it is necessary to seal temporarily the end of a tube so located that a seal can be effected only by means engaged with the interior of the tube, for test purposes.

The object of the present invention is to produce a simple and novel implement which may be slipped into a tube and be quickly expanded into locking engagement with the surrounding tube, and which may easily be detached after its purpose has been served.

In some cases it is necessary not only to seal a tube end but also to permit the introduction of a fluid into a tube so sealed.

Therefore, a further object of the invention is so to construct such a sealing implement that fluids may be introduced through the same into a tube which is being sealed thereby.

In carrying out my invention I employ a body member which is an easy fit in the tube to be sealed, together with a stem extending axially through and protruding at its ends from such member. Surrounding the stem, at what is the inner end of the device when applied to a tube, is an expansible element, and connected to the other end of the stem is a means to pull the stem lengthwise and cause said element to expand and press tightly against the interior surface of the tube. Thus the device is locked in place. The actual sealing is effected by a suitable packing between the body member and the tube and a second packing between the stem and the body member; these packings being preferably conventional O-rings.

The various features of novelty whereby the present invention is characterized will hereinafter be pointed out with particularity in the claim; but, for a full understanding of the invention and its objects and advantages, reference may be had to the following detailed description taken in connection with the accompanying drawing, wherein:

Fig. 1 is a central, longitudinal section through an implement embodying the present invention inserted in, but not yet locked to, a tube.

Fig. 2 is a view similar to Fig. 1 showing the implement locked to the tube, and with the operating lever swung through an angle of ninety degrees about the axis of the implement.

Fig. 3 is an axial section taken on a plane at right angles to the plane of Fig. 2 or on line 3—3 in Fig. 6, showing only a fragment of the implement.

Fig. 4 is a view, on a larger scale, partly in elevation and partly in section, of the expansible sleeve or collet.

Fig. 5 is a section on line 5—5 in Fig. 1.

Fig. 6 is a section on line 6—6 in Fig. 2.

Fig. 7 is an axial section showing only one end of the implement, slightly modified.

Fig. 8 is a view similar to Fig. 2 showing further modifications.

Referring to Figs. 1–6 of the drawing, 1 represents a body member circular in cross section. In the arrangement shown, it comprises two coaxial cylindrical sections 2 and 3; section 3 being slightly smaller in diameter than the internal diameter of a tube T to which the implement is to be applied, whereas section 2 has a somewhat larger diameter so as to provide a shoulder 4 at the juncture of these two sections. This shoulder engages the end edge of the tube and serves as a stop to prevent the body member from being pushed too far into the tube. Section 3 terminates in a frusto-conical part 5.

Extending axially through the body member and slidable within the same, is a cylindrical stem 6; the stem protruding from both ends of the body member. On the end of the stem protruding from the frusto-conical part 5 of the body member is a frusto-conical part 7; the two frusto-conical parts being reversed with respect to each other.

Surrounding the parts 5 and 7 is an expansible sleeve or collet 8, preferably of spring bronze. This sleeve has a thick wall and the bore thereof is enlarged at both ends into frusto-conical seats, 9 and 10, respectively. Upon assembling the parts, element 5 on the body member is engaged in seat 9 and seat 10 receives element 7. The sleeve is divided part way through its length by slots 11, some of which extend through one end while the others enter at the other end. Normally the sleeve is a cylinder slightly smaller in diameter than the internal diameter of the tube, as shown in Fig. 1.

In order to prevent the collet or sleeve from turning on the stem and body member, a pin 12 may extend through one of the slots 11 and into part 7 on the stem and a second pin 13 may extend through the same or another slot and into frusto-conical part 5 on the body member.

The second end of stem 6 is provided with screw threads 6$^a$. Screwed onto this end of the stem is a short pull rod 14, which lies between two parallel wings 15 of a jaw 16. A pin 17 extends through the jaw 16 and the pull rod 14 at right angles to the stem 6. An eye bolt 18 is screwed into the closed end of the jaw and serves as a lever to turn the jaw about pin 17. Wings 15 are provided with cam edges 19 adapted to thrust against the adjacent end face of body member 1.

Surrounding section 3 of the body member is an O-ring 20 seated in a groove 21 in the body member and engaging the inner surface of the tube when the implement is inserted in the tube. There is a second O-ring 22 surrounding the stem 6 and seated in a groove 24 in the body member 1.

In Fig. 1 the implement is shown as having been inserted in the tube, but not being locked to the latter. However, O-ring 21 is in sealing relation with the tube. The jaw 16 is in the position wherein the flat portion 19$^a$ faces the body member but exerts no pull on the stem 6. To lock the implement to the tube one must swing the eye bolt 18 to bring cam edge 19 into contact with the body member and exert a progressively increasing pull on the stem 6. This pull results in expanding the ends of sleeve 8, as in Fig. 2, into intimate contact with the tube. The pulling force may be regulated by turning the jaw about the axis of the stem 6, to screw part 14 farther onto the stem 6 and increase the pull or by unscrewing it to lessen the pull during a locking operation.

It will thus be seen that one needs only to slip the implement into a tube and swing the eye bolt to provide an effective lock, and that the eye bolt needs only to be swung back to the idle position in order to permit the implement to be withdrawn.

While the implement remains locked to the tube, the conventional O-rings function to prevent escape of fluids from within the tube through the end thereof which contains the sealing means.

In a simplified form, as shown in Fig. 7, a large knurled nut 25 is used as a substitute for parts 14, 16 and 18.

In Fig. 8 further modifications are illustrated. In order to permit fluids to be delivered into a tube through the sealing means, the stem 26 is provided with an axial passage 27 extending from the frusto-conical part 26ª almost to the far end of the body member 28 where it is connected to a radial passage 29. A large drill hole 30 is bored into the side of the body member to cross the bore in the body member at such a point as to provide a chamber in communication with passage 29. This chamber may be closed by a plug 31 or, upon removal of the plug, a supply pipe may be screwed into the opening to deliver a fluid.

Instead of using a separate expansible collet or sleeve, the latter may be an integral extension of the body member. Thus in Fig. 8 the frusto-conical terminal on the body member is omitted and the body member is simply extended in the form of a sleeve 32 slotted lengthwise at 33 inwardly from the free end. The bore at the free end of this sleeve is a frusto-conical seat 34 similar to seat 10 in the other form. The stem 26 is provided with a frusto-conical end section 26ª that fits into seat 34. In this form of the invention the sleeve is expanded at one end only, as shown in Fig. 8, to lock the implement in the tube.

I claim:

1. An internal tube sealer comprising a body member adapted to fit slidably at one end in a tube, a resilient metal sleeve aligned with the body member at said end, said sleeve having slots extending through an end of the sleeve to points spaced apart from the other end, a stem extending axially through said body member and sleeve and having at one end means to expand the sleeve into engagement with the tube when moved lengthwise in a first direction and to permit the sleeve to contract when the stem is moved lengthwise in a second direction, means on the stem to pull it in the first direction, an O-ring surrounding the stem to prevent fluids from flowing past the same around the stem, and a second O-ring surrounding said body member, in a zone adapted to lie within a tube to be sealed, to engage the interior of the tube and prevent the passage of fluids past the second O-ring.

2. A tube sealer as set forth in claim 1, wherein the body member contains in one side an opening in the part adapted to remain outside of the tube and a removable closure for said opening, and wherein the stem contains a passage extending from the end of the stem that is adapted to be placed within a tube toward the opposite end and through the periphery of the stem to communicate with said opening.

References Cited in the file of this patent

UNITED STATES PATENTS

| | | |
|---|---|---|
| 543,745 | Meyer | July 30, 1895 |
| 546,258 | Suverkrop | Sept. 10, 1895 |
| 1,068,793 | Mason | July 29, 1913 |
| 1,463,824 | Leuvelink | Aug. 7, 1923 |
| 1,466,450 | Kothe | Aug. 28, 1923 |
| 1,949,498 | Stone et al. | Mar. 6, 1934 |
| 2,315,623 | Jacobi | Apr. 6, 1943 |
| 2,475,748 | Leroy | July 12, 1949 |
| 2,488,796 | Baier | Nov. 22, 1949 |
| 2,564,232 | Ransenberger | Aug. 14, 1951 |
| 2,607,370 | Anderson | Aug. 19, 1952 |
| 2,695,632 | Brock | Nov. 30, 1954 |
| 2,763,910 | Braatelien | Sept. 25, 1956 |
| 2,764,184 | Fitzhugh et al. | Sept. 25, 1956 |